(12) United States Patent
Ishizawa et al.

(10) Patent No.: US 7,012,123 B2
(45) Date of Patent: Mar. 14, 2006

(54) ACRYLIC POLYMER AND CHARGE TRANSPORT MATERIAL

(75) Inventors: Hideaki Ishizawa, Osaka (JP); Tamaki Nakano, Nara (JP)

(73) Assignee: Sekisvi Chemical Co., Ltd., Osaka (JP)

( * ) Notice: Subject to any disclaimer, the term of this patent is extended or adjusted under 35 U.S.C. 154(b) by 40 days.

(21) Appl. No.: 10/421,463

(22) Filed: Apr. 24, 2003

(65) Prior Publication Data
US 2003/0204036 A1  Oct. 30, 2003

(30) Foreign Application Priority Data

Apr. 26, 2002 (JP) .............................. 2002-127106
Jul. 25, 2002 (JP) .............................. 2002-216020

(51) Int. Cl.
*C08F 10/00* (2006.01)

(52) U.S. Cl. .................. 526/284; 430/72; 430/96; 560/220

(58) Field of Classification Search ................ 526/284; 430/72, 96; 560/220, 221
See application file for complete search history.

(56) References Cited

U.S. PATENT DOCUMENTS

| | | | |
|---|---|---|---|
| 4,046,564 A | 9/1977 | Turner | |
| 4,122,113 A | 10/1978 | Turner | |
| 4,663,412 A | 5/1987 | Guillet et al. | |
| 6,172,140 B1 * | 1/2001 | Toh et al. | 526/289 |

FOREIGN PATENT DOCUMENTS

JP   2000-338344   12/2000

OTHER PUBLICATIONS

Habaue et al "Stereocontrol in radical Polymerization" Japan Chemical Journal Forum, Jan. 30, 2001, vol. 1, Issue 1, pp. 46-52 (abstract).*

Nishino J et al: "Stereoregularities of Ring-Containing Polymethacrylates Obtained by Radical Polymerization" Polymer Journal, Society of Polymer Science. Tokyo, JP, vol. 2, No. 5, 1971, pp. 555-559, XP009015529.

* cited by examiner

*Primary Examiner*—Tatyana Zalukaeva
(74) *Attorney, Agent, or Firm*—Townsend & Banta

(57) ABSTRACT

An acrylic polymer suitable for use as a charge transport material, the acrylic polymer containing pendant π-conjugated groups represented by the following general formula (1) and having a triad syndiotacticity or triad isotacticity of at least 60%:

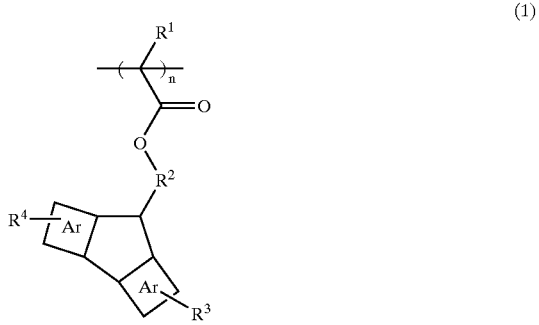

(1)

wherein in the formula (1), Ar represents an aromatic group, $R^1$ represents hydrogen or a methyl group, $R^2$ represents an organic group or none, $R^3$ and $R^4$ both represent hydrogen or at least one of them represents an electron-donating or electron-withdrawing group, and n denotes an integer of 2 or larger.

12 Claims, No Drawings

ACRYLIC POLYMER AND CHARGE TRANSPORT MATERIAL

BACKGROUND OF THE INVENTION

1. Field of the Invention

The present invention relates to an acrylic polymer which enables provision of a charge transport material having superior charge transporting capability and also to a charge transport material utilizing the acrylic polymer.

2. Description of Related Art

A variety of charge transport materials have been conventionally used, including inorganic materials such as amorphous Se and Si, and low- and high-molecular organic materials. Among them, organic charge transport materials are widely used for photosensitive electrophotographic materials, because they are less toxic and can be manufactured at low costs.

In recent years, organic charge transport materials have been developed which exhibit superior electrical conductivity and charge transporting capability. Examples of low-molecular organic charge transport materials include Alq3 and starburst amine. Examples of high-molecular organic charge transport materials include polyvinyl carbazole, polyacetylene, polythiophene, polyphenylvinylene and polyfluorene.

Although superior in charge transporting capability, the low-molecular organic charge transport materials suffer from several problems, e.g., in heat resistance and film-forming properties. This has led to recent development of charge transport materials which comprise organic polymers and exhibit good heat resistance and film-forming properties, resulting in the findings that some of them exhibit comparable or even superior physical properties relative to low-molecular charge transport materials.

For example, a 10% isotactic, 39% heterotactic and 51% syndiotactic acrylic polymer obtainable by polymerization of 9-fluorenyl-methacrylate using a free-radical initiator is known (Polymer Journal, Vol. 2, No. 5, pp 555–559 (1971)). This acrylic polymer obtained by polymerization of 9-fluorenyl-methacrylate using a free-radical initiator can be a charge transport material, but its charge transporting capability has been found to be insufficient.

It is understood that in polythiophene or polyfluorene, polymers interact with each other to have an spatial arrangement of π-conjugated groups as in a liquid crystal, thus enabling transportation of charges. However, this stereoregularity changes with temperature and this change has been considered to cause difficulty in transporting charges in a stable fashion.

SUMMARY OF THE INVENTION

In view of the current state of the art as described above, an object of the present invention is to provide an acrylic polymer which enables provision of a charge transport material having superior charge transporting capability and also provide a charge transport material utilizing the acrylic polymer.

A first invention is an acrylic polymer containing pendant π-conjugated groups represented by the following general formula (1) and having a triad syndiotacticity of at least 60%.

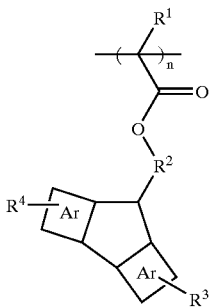

(1)

In the formula (1), Ar represents an aromatic group, $R^1$ represents hydrogen or a methyl group, $R^2$ represents an organic group or none, $R^3$ and $R^4$ both represent hydrogen or at least one of them represents an electron-donating or electron-withdrawing group, and n denotes an integer of 2 or larger.

A second invention is an acrylic polymer containing pendant π-conjugated groups represented by the following general formula (1) and having a triad isotacticity of at least 60%.

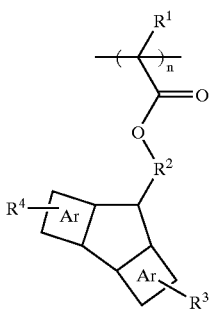

(1)

In the formula (1), Ar represents an aromatic group, $R^1$ represents hydrogen or a methyl group, $R^2$ represents an organic group or none, $R^3$ and $R^4$ both represent hydrogen or at least one of them represents an electron-donating or electron-withdrawing group, and n denotes an integer of 2 or larger.

The present invention is below described in detail.

The inventors of this application have noticed that the acrylic polymer derived from polymerization of 9-fluorenyl methacrylate has a low syndiotacticity or isotacticity content, and, pursuant to energetic investigations, have found that increasing the syndiotacticity or isotacticity content by stereostructural control results in obtaining an acrylic polymer which enables preparation of a charge transport material having a high charge transporting capability, leading to completion of the present invention.

In the acrylic polymer derived from polymerization of 9-fluorenyl methacrylate, the regularity in stereostructure of the polymer is presumed to be largely responsible for the defect that disturbs electron transfer. Particularly, the lower syndiotacticity or isotacticity content is considered to increase the occurrence of charge trap, resulting in the failure to obtain a high charge transporting capability.

Increase of the syndiotacticity or isotacticity content by stereostructural control leads to the formation of a polymer structure in which the π-conjugated groups of the polymer itself are sterically arranged in a regular and ordered manner, as in a liquid crystal. This is considered to prevent charge trap and realize an excellent charge transporting capability.

The acrylic polymer of the present invention is an acrylic polymer having pendant π-conjugated groups represented by the foregoing general formula (1).

In the acrylic polymer of the present invention, its syndiotacticity or isotacticity can be increased by controlling the stereostructure of the acrylic polymer by selection of polymerization conditions.

It is preferred that at least one of $R^3$ and $R^4$ in the general formula (1) is an electron-donating or electron-withdrawing group. This renders the π-conjugated group more electron-donating or electron-accepting. Where $R^3$ and $R^4$ are both hydrogen, the π-conjugated group is electron-donating.

In the present invention, the electron-donating group refers to a substituent group whose introduction can enhance the electron-donating nature of the π-conjugated group and can be illustrated by F, Cl, Br, I, OH, OR, O(C=O)R, $NR_2$, SR, SH, alkyl or the like, wherein R represents an organic group. Preferred among them are F, alkyl and $NR_2$. More preferred are pentyl, t-butyl, diphenylamino, dimethylamino and diethylamino groups.

In the present invention, the electron-withdrawing group refers to a substituent group whose introduction can enhance the electron-accepting nature of the π-conjugated group and can be illustrated by cyano, —(C=O)R, (S=O)OR, $NO_2$, phenyl, carboxyl, carboxylic ester or the like, wherein R represents an organic group.

Preferred among the acrylic polymers of the present invention is the acrylic polymer represented by the following general formula (2), which has sufficient overlap of fluorene skeletons and accordingly has a superior charge transporting capability.

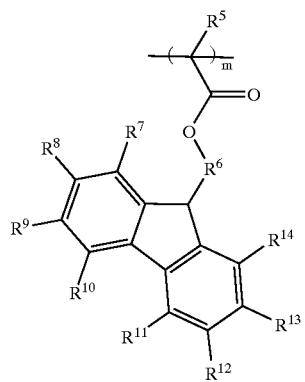

(2)

In the formula (2), $R^5$ represents hydrogen or a methyl group, $R^6$ represents an organic group or none, $R^7$–$R^{14}$ all represent hydrogen or at least one of them represents an electron-withdrawing or electron-donating group, and m donates an integer of 2 or larger.

The acrylic polymer represented by the foregoing general formula (2) is not particularly specified. Examples of preferred acrylic polymers include those with $R^7$–$R^{14}$ being all hydrogen; those with $R^8$ and $R^{13}$ being independently amino or substituted amino; those with $R^8$ and $R^{13}$ being both amino and $R^7$, $R^9$, $R^{10}$, $R^{11}$, $R^{12}$ and $R^{13}$ being all hydrogen; those with $R^8$, $R^{11}$ and $R^{13}$ being all $NO_2$ and $R^7$, $R^9$, $R^{10}$, $R^{12}$ and $R^{14}$ being all hydrogen; those with $R^8$ and $R^{13}$ being both the diphenylamino group represented by the following general formula (3) and $R^7$, $R^9$, $R^{10}$, $R^{11}$, $R^{12}$ and $R^{14}$ being all hydrogen.

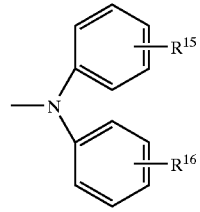

(3)

In the formula (3), $R^{15}$ and $R^{16}$ are independently hydrogen or an organic group.

The acrylic polymer of the present invention may have a structure deriving from a monomer which has at least one polymerizable double bond per molecule, other than the structure having pendant π-conjugated groups represented by the foregoing general formula (1). Such a structure can be obtained by copolymerizing, preferably block copolymerizing, a monomer, preferably a macromonomer, having at least one polymerizable double bond per molecule, in the preparation of the acrylic polymer of the present invention.

The monomer having at least one polymerizable double bond per molecule can be illustrated by a vinyl- or (meth)acryloyl-containing monomer. Examples of such monomers include aminoalkyl acrylate esters such as N,N-dimethyl aminoethyl acrylate, N,N-diethyl aminoethyl acrylate and N, t-butyl aminoethyl acrylate; styrenic monomers such as α-methylstyrene, vinyltoluene, chlorostyrene, t-butylstyrene and styrene; vinyl ether monomers such as methyl vinyl ether, ethyl vinyl ether and isobutyl vinyl ether; (meth)acrylonitrile, butadiene, isoprene, vinyl chloride, vinylidene chloride, vinyl acetate, vinyl ketone, N-vinyl pyrrolidone, vinyl pyridine, (meth)acrylamide, vinyl carbazoles, divinyl benzene, fumaric acid, maleic acid, itaconic acid, phthalic acid, monoalkyl ester of fumaric acid, dialkyl ester of fumaric acid, monoalkyl ester of maleic acid, dialkyl ester of maleic acid, monoalkyl ester of itaconic acid, dialkyl ester of itaconic acid, monoalkyl ester of phthalic acid, dialkyl ester of phthalic acid, and the like.

The aforementioned macromonomer refers to a polymer having a polymerizable unsaturated double bond at an end of its backbone skeleton.

Examples of preferred macromonomers include acrylic macromonomers having a polyacryl backbone skeleton, olefinic macromonomers having a polyolefin backbone skeleton, and butadiene. Examples of preferred functional groups which constitute the above terminal polymerizable unsaturated double bond include acryloyl and methacryloyl groups. These monomers may be used alone or in combination.

Preferably, the acrylic polymer of the present invention has a number average molecular weight in the range of 1,000–10,000,000. If below 1,000, the number of molecules occupying a unit volume may increase to the extent that the overlapping of the π-conjugated groups between molecules becomes more influential in charge transportation than within molecules. If above 10,000,000, the acrylic polymer may become less soluble in a solvent. More preferably, the acrylic polymer has a number average molecular weight in the range of 2,000–1,000,000.

Preferably, the acrylic polymer of the present invention has a polydispersity (Mw/Mn) in the range of 1–10. If above 10, a low-molecular weight content increases to occasionally result in the reduced charge transporting capability. An upper limit of the polydispersity is more preferably 5, further preferably 3.

Preferably, the acrylic polymer of the present invention has a glass transition temperature between −20° C. and 300° C. If below −20° C., its heat resistance may be lowered. If above 300° C., its solubility may decrease to result in the reduced film-forming properties. More preferably, its glass transition temperature ranges between 40° C. and 300° C.

The acrylic polymer of the first invention has a triad syndiotacticity of at least 60%. If below 60%, the charge transporting capability of the resulting charge transport material drops to an insufficient level.

This is probably because the stereoregularity of the acrylic polymer is largely responsible for the defect that disturbs electron transfer and its lower syndiotacticity content increases the occurrence of charge trap to result in the failure to obtain a high charge transporting capability.

The triad syndiotacticity of the acrylic polymer of the present invention can be determined by converting the acrylic polymer of the present invention to polymethyl methacrylate, measuring $^1$H-NMR of polymethyl methacrylate and ascertaining the number of hydrogens as calculated from an integrated value under an α-methyl peak.

The acrylic polymer of the second invention has a triad isotacticity of at least 60%. If below 60%, the charge transporting capability of the resulting charge transport material becomes insufficient.

This is probably because the stereoregularity of the acrylic polymer is responsible largely for the defect that disturbs electron transfer and the lower isotacticity content increases the occurrence of charge trap to result in the failure to obtain a high charge transporting capability.

The triad isotacticity of the acrylic polymer of the present invention can be determined by converting the acrylic polymer of the present invention to polymethyl methacrylate, measuring $^1$H-NMR of the polymethyl methacrylate and observing a shift position of an α-methyl group of triad isotactic polymethyl methacrylate.

The method used to prepare the acrylic polymer of the present invention is not particularly specified. For example, a method may be suitably used which comprises anionically polymerizing an acrylic monomer having a pendant functional group with a fluorene skeleton represented by the following general formula (4):

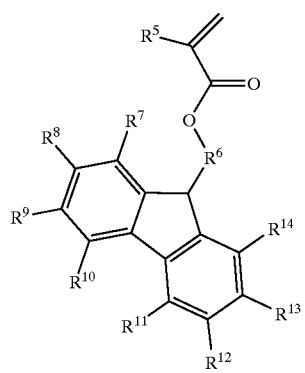

(4)

The method used to prepare the acrylic monomer having a pendant functional group with a fluorene skeleton represented by the foregoing general formula (4) is not particularly specified. Examples of useful methods include a method wherein hydroxyl-containing (meth)acrylate is reacted with a fluorene derivative either having COCl at its 9-position or having a COCl substituent group in its 9-position; a method wherein (meth)acrylic chloride is reacted with a hydroxyl-containing fluorene derivative; a method wherein (meth) acrylate having at least one functional group selected from the group consisting of hydroxyl, amino and carboxyl is reacted with isocyanate-containing fluorene derivative; a method wherein isocyanate-containing (meth)acrylate is reacted with a fluorene derivative having at least one functional group selected from the group consisting of amino, hydroxyl and carboxyl.

Examples of hydroxyl-containing (meth)acrylates include hydroxy acrylate and hydroxy methacrylate.

Examples of amino-containing (meth)acrylates include acrylamide, methacrylamide, a compound represented by the general formula $(CH_2=CH-COO)_n-R^{1a}-(NH_2)_m$ and a compound represented by the general formula $(CH_2=C(CH_3)-COO)_n-R^{1a}-(NH_2)_m$, wherein m and n are independently an integer of 1 or larger and $R^{1a}$ represents an organic group consisting of C, H and O.

Examples of carboxyl-containing (meth)acrylates include acrylic acid, methacrylic acid, a compound represented by the general formula $(CH_2=CH-COO)_n-R^{1a}-(COOH)_m$ and a compound represented by the general formula $(CH_2=C(CH_3)-COO)_n-R^{1a}-(COOH)_m$, wherein m and n are independently an integer of 1 or larger and $R^{1a}$ represents an organic group consisting of C, H and O.

Examples of isocyanate-containing (meth)acrylates include isocyanatoacrylate, isocyanatomethacrylate, a compound represented by the general formula $(CH_2=CH-COO)_n-R^{1a}-(NCO)_m$ and a compound represented by the general formula $(CH_2=C(CH_3)-COO)_n-R^{1a}-(NCO)_m$, wherein m and n are independently an integer of 1 or larger and $R^{1a}$ represents an organic group consisting of C, H and O.

Examples of hydroxyl-containing fluorene derivatives include 9-hydroxyfluorene, 9-fluorene methanol, 9-hydroxy-9-fluorenecarboxylic acid, 9-phenyl-9-fluorenol, 1-hydroxy-9-fluorene and 2-hydroxy-9-fluorene.

Examples of fluorene derivatives either having COCl at the 9-position or having a COCl substituent group in the 9-position include 9-fluorenyl methylchloro formate, (+)-1-(9-fluorenyl) ethylchloro formate and (−)-1-(9-fluorenyl) ethylchloro formate.

Examples of amino-containing fluorene derivatives include 9-aminofluorene, 2,7-diaminofluorene, 2-aminofluorene and 2-amino-9-fluorenon.

Examples of carboxyl-containing fluorene derivatives include 9-hydroxy-9-fluorenecarboxylic acid, 9H-fluorene-9-carboxylic acid, 9H-fluorene-9-acetic acid, 9-fluorene-2-carboxylic acid and 9H-fluorene-4-carboxylic acid.

Examples of isocyanate-containing fluorene derivatives include 9H-fluorene-9-yl isocyanate and 9H-fluorene-2-yl isocyanate.

The anionic polymerization initiator used to initiate anionic polymerization of the acrylic monomer having a pendant functional group with the fluorene skeleton represented by the foregoing general formula (4) is not particularly specified. Examples of useful anionic initiators include RLi, RMgX, $R_2$Mg, RCaX, Al$(C_2H_5)_3$, LiAlH$_4$, NaR and KR, wherein R represents an alkyl, aralkyl or aromatic group having 1–50, preferably 1–20, carbon atoms, such as a butyl, benzyl or phenyl group; and X represents halogen.

Among them, RLi is preferred for use in the preparation of the highly syndiotactic acrylic polymer of the first invention and RMgX is preferred for use in the preparation of the highly isotactic acrylic polymer of the second invention.

Examples of solvents suitable for use in the anionic polymerization are polar solvents, particularly $CHCl_3$ and $CH_2Cl_2$.

In the preparation of the highly isotactic acrylic polymer of the second invention, the anionic polymerization temperature is preferably maintained within the range between −80° C. and 25° C., more preferably between −20° C. and 10° C. Preferably, the temperature is kept within the range between −80° C. and −60° C. when the initiator is added, and then raised to the range between −20° C. and 10° C. within 30 minutes, whereby the anionic polymerization is carried out.

Because the acrylic polymer of the present invention is highly syndiotactic or isotactic, a distance between adjacent π-conjugated groups is small and can be narrowed to 3–20 angstroms, preferably 3–10 angstroms.

The acrylic polymer of the present invention is rendered highly syndiotactic or isotactic by the stereostructural control and accordingly exhibits a higher charge transporting capability than acrylic copolymers without stereostructural control. The stereostructurally controlled acrylic polymer, if having a syndiotacticity of at least 60%, exhibits an improved charge transporting capability and, if having an isotacticity of at least 60%, exhibits a further improved charge transporting capability relative to acrylic copolymers without stererostructural control.

A charge transport material having a superior charge transporting capability can be prepared by using the acrylic polymer of the present invention. That is, mixing a dopant and the acrylic polymer of the present invention results in the formation of a charge transfer complex which exhibits a very high charge transporting capability.

The present invention also includes a charge transport material containing a dopant and the acrylic polymer of the present invention.

The charge transport material of the present invention contains the acrylic polymer of the present invention and a dopant.

The acrylic polymers of the present invention, either alone or in combination, may be used to constitute the charge transport material. Also, the acrylic polymer of the present invention may be used in combination with an acrylic polymer other than the acrylic polymer of the present invention.

Examples of dopants include electron-accepting and electron-donating substances. In the case where the π-conjugated group in the acrylic polymer of the present invention is an electron-accepting functional group, an electron-donating substance is used as the dopant. On the other hand, where the π-conjugated group in the acrylic polymer of the present invention is an electron-donating functional group, an electron-accepting substance is used as the dopant.

Useful electron-accepting compounds are those compounds which have stronger electron affinities than the acrylic polymer of the present invention if its π-conjugated group is an electron-donating functional group. Examples of such electron-accepting compounds include halogens such as $I_2$, $Br_2$, $Cl_2$, $ICl$, $ICl_3$, $IBr$ and $IF$; Lewis acids such as $BF_3$, $PF_5$, $AsF_5$, $SbF_5$, $SO_3$ and $BBr_5$; salts of Lewis acids associated with counter ions such as $BF_4^-$, $PF_6^-$, $AsF_6^-$, $SbF_6^-$ and $ClO_4^-$; protonic acids such as $HNO_3$, $H_2SO_4$, $HClO_4$, $HF$, $HCl$, $FSO_3H$ and $CFSO_3H$; halides of transition metals such as $FeCl_3$, $MoCl_5$, $WCl_5$, $SnCl_4$, $MoF_5$, $FeOCl$, $RuF_5$, $TaBr_5$, $SnI_4$ and $InCl_3$; halides of La, Ce, Pr, Nd, Sm and other lanthanides; (9-fluoronylidene)acetonitrile, (9-fluoronylidene)malononitrile, (2,4,7-trinitro-9-fluoronylidene)acetonitrile, (2,4,7-trinitro-9-fluoronylidene)malononitrile, o-dinitrobenzene, m-dinitrobenzene, p-dinitrobenzene, 2,4,7-trinitrobenzene, 2,4,7-trinitrotoluene, tetracyanoquinodimethane (TCNQ), tetracyanoethylene (TCNE) and dichlorodicyanobenzoquinone (DDQ).

Useful electron-donating compounds are those compounds which have lower ionization potentials than the acrylic polymer of the present invention if its π-conjugated group is an electron-donating functional group. Examples of such electron-accepting compounds include hexamethylbenzene, alkali metals, compounds associated with an ammonium counter ion, and lanthanoid compounds.

The charge transport material of the present invention preferably contains the dopant in the amount of 0.1–100 parts by weight, based on 100 parts by weight of the acrylic polymer. If below 0.1 parts by weight, the material may not exhibit a sufficient charge transporting capability. If above 100 parts by weight, the heat resistance and film-forming properties of the resulting material may be lowered.

DESCRIPTION OF THE PREFERRED EXAMPLES

The present invention is below described in detail by referring to non-limiting examples.

EXAMPLE 1

(1) Preparation of Highly Syndiotactic Acrylic Polymer

1) Synthesis of Monomer (9-fluorenyl Methacrylate)

9-fluorenol, weighing 2.00 g (11 mmol), was charged into a dried 200 ml two-neck flask in which it was vacuum dried for 30 minutes. Thereafter, 180 ml of benzene dried using CaH2 and distilled, together with 1.40 g (13.75 mmol) of triethylamine, were added and dissolved. The flask contents were cooled to 6° C., 1.47 g (13.75 mmol) of methacryloyl chloride was gradually added in a dropwise manner and, subsequent to the dropwise addition, the mixture was stirred at room temperature for 24 hours.

Using a separating funnel, the resulting solution was washed with water and a saturated aqueous solution of $NaHCO_3$, and an organic layer was separated and then dried with $MgSO_4$. This organic layer was desolvated using an evaporator and only a portion thereof that dissolved in hexane was purified using a column chromatography (developing solution: benzene, filler: 80 g of Silica Gel 60N (spherical, neutral), column diameter: 4 cm) to remove impurities. As a result, 9-fluorenyl methacrylate (weight 0.90 g, yield 40%), in the white solid form, was obtained. A melting point of this solid was measured to be 61° C. Also, $^1$H-NMR (500 MHz, $CDCl_3$ solution) of the solid was measured using an NMR measuring equipment. The following results were obtained:

δ=7.696 (2H, d), 7.580 (2H, d), 7.427 (2H, t), 7.306 (2H, t), 6.868 (1H, s), 6.166 (1H, s), 5.621 (1H, s) and 2.015 (3H,s)

2) Synthesis of Acrylic Polymer (poly(9-fluorenyl methacrylate))

9-fluorenyl methacrylate synthesized in the same manner as in Example 1, weighing 0.172 g (0.687 mmol), was charged into a dried 25 ml polymerization tube in which it was vacuum dried for 30 minutes. Thereafter, 3.2 ml of distilled tetrafuran (THF) was added and dissolved. The tube contents were cooled to −78° C., 0.07 ml (0.095 mmol, charge ratio 1/7.2) of a pentane solution containing 1.36 M t-BuLi was added, and the mixture was allowed to react at −78° C. for 24 hours. 2 ml of methanol was then added to the mixture at −78° C., followed by termination of the reaction. The reaction solution was subsequently added to 30 ml methanol and a soluble portion dissolved in methanol was separated from an insoluble portion. After desolvation, a weight of the soluble portion was measured to be 17.2 mg.

The insoluble portion obtained was added to 30 ml hexane and a soluble portion dissolved in hexane was separated from an insoluble portion. After desolvation, a weight of the soluble portion was measured to be 2.3 mg. The insoluble portion was vacuum dried for 24 hours to obtain poly(9-fluorenyl methacrylate). A weight of poly(9-fluorenyl methacrylate) was 0.147 g.

A number average molecular weight and a polydispersity (Mw/Mn) of the product, poly(9-fluorenyl methacrylate), were measured. Measurement revealed a number average molecular weight (Mn) of 2,600 and a polydispersity (Mw/Mn) of 1.25. Also, $^1$H-NMR (500 MHz, CDCl$_3$ solution) of the product was measured using an NMR measuring equipment. The following results were obtained:

δ=6.988–7.501 (8H, m), 6.322 (1H, s), 2.108 (1.79H, s), 1.127 (2.9H, s)

(2) Determination of Tacticity 0.5 ml water and 5 ml concentrated sulfuric acid were added to poly(9-fluorenyl methacrylate) as obtained above. The mixture was allowed to react at 60° C. for 2 weeks under nitrogen atmosphere. Thereafter, 15 ml distilled water was gradually added in a dropwise manner to the reaction mixture at 0° C. which was subsequently made into a pH 11 aqueous solution by addition of a 33 wt. % aqueous solution of sodium hydroxide. This aqueous solution was then increased in volume to 35 ml by further addition of distilled water. After addition of 3.5 g sodium hydroxide, the aqueous solution was allowed to react at 60° C. for 100 hours. The resultant was made into a pH 2 aqueous solution, by addition of concentrated hydrochloric acid, which was subsequently dewatered by an evaporator and vacuum dried for 12 hours.

Subsequent to addition of 10 ml ether solution containing diazomethane, the resultant was reacted at room temperature for 24 hours and, subsequent to addition of 6 ml ether solution containing diazomethane, further reacted at room temperature for 24 hours. Desolvation using an evaporator and subsequent extraction using chloroform followed. By these series of reactions, poly(9-fluorenyl methacrylate) was converted to polymethyl methacrylate.

$^1$H-NMR (500 MHz, CDCl$_3$ solution) of polymethyl methacrylate as such obtained was measured using an NMR measuring equipment. The following results were obtained:

δ(ppm)=3.57 (3H), 1.78 (1.8H), 0.82 (2.69H) and 0.70 (0.018H).

A triad isotacticity of poly(9-fluorenyl methacrylate) was determined from $^1$H-NMR of polymethyl methacrylate. That is, an α-methyl peak of syndiotactic polymethyl methacrylate is observed at 0.82 ppm and an intensity for all α-methyl groups therein is 3H. From this, the syndiotacticity was determined to be 90%.

(3) Measurement of Hole Mobility of Charge Transport Material (TOF Method)

Poly(9-fluorenyl methacrylate) was formulated into a 10 wt. % CH$_2$Cl$_2$ solution. 2,4,7-trinitrofluorene malononitrile, as a dopant, was dissolved therein in the amount of 1 weight %, based on the weight of poly(9-fluorenyl methacrylate). The resulting solution was cast onto an ITO glass substrate and then dried to provide thereon a charge transport material in the form of a thin film having a thickness of 1 μm.

Aluminum was vacuum deposited onto the resulting thin film to a thickness of 1,000 angstroms to form a 5 mm×5 mm aluminum electrode. A hole transfer time was measured by applying a voltage of 5 V to this electrode simultaneously with exposure thereof to a pulse laser beam (nitrogen laser, 150 μJ) at 337 nm. From a result of measurement at room temperature, a hole mobility was found to be $1.02 \times 10^{-4}$ cm$^2$V$^{-1}$sec$^{-1}$.

(4) Electrical Conductivity of Charge Transport Material

Poly(9-fluorenyl methacrylate) was formulated into a 10 wt. % CH$_2$Cl$_2$ solution. 2,4,7-trinitrofluorene malononitrile, as a dopant, was dissolved therein in the amount of 1 weight %, based on the weight of poly(9-fluorenyl methacrylate). The resulting solution was cast onto an ITO glass substrate and then dried to provide thereon a charge transport material in the form of a thin film having a thickness of 1 μm.

An aluminum electrode having a width of 5 mm, an interelectrode distance of 90 μm and a thickness of 100 nm was deposited onto the resulting thin film. Using this sample, an electrical conductivity of the charge transport material was measured, resulting in the value of $1.13 \times 10^{-5}$ S/cm.

EXAMPLE 2

(1) Preparation of Highly Isotactic Acrylic Polymer 9-fluorenyl methacrylate synthesized in the same manner as in Example 1, weighing 0.172 g (0.687 mmol), was charged into a dried 25 ml polymerization tube in which it was vacuum dried for 30 minutes. Thereafter, 3.2 ml of distilled tetrafuran (THF) was added and dissolved. The tube contents were then cooled to −78° C. Subsequently, 0.069 mmol of an ether solution containing 0.57 M t-BuMgBr was added. The resulting mixture, after 5 minutes, was elevated to 0° C. and then allowed to react for 24 hours. 2 ml of methanol was then added to the mixture at 0° C., followed by termination of the reaction. The reaction solution was subsequently added to 30 ml methanol and a soluble portion dissolved in methanol was separated from an insoluble portion. After desolvation, a weight of the soluble portion was measured to be 84.3 mg.

The insoluble portion obtained was added to 30 ml hexane and a soluble portion dissolved in hexane was separated from an insoluble portion. After desolvation, a weight of the soluble portion was measured to be 83 mg.

The soluble portion was partitioned by a silica gel chromatography to obtain poly(9-fluorenyl methacrylate). A weight of poly(9-fluorenyl methacrylate) was 43 mg.

A number average molecular weight and a polydispersity (Mw/Mn) of the product, poly(9-fluorenyl methacrylate), were measured. Measurement revealed a number average molecular weight (Mn) of 16,821 and a polydispersity (Mw/Mn) of 1.60. Also, $^1$H-NMR (500 MHz, CDCl$_3$ solution) of the product was measured using an NMR measuring equipment. The following results were obtained:

δ=7.187–8.017 (8H, m), 6.836 (1H, s), 2.690 (1H, s), 1.944 (1H, s), 1.519 (3H, s) and 0.936 (0.28H, s)

(2) Determination of Tacticity 0.5 ml water and 1 ml concentrated sulfuric acid and 0.1 ml water were added to 43 mg of poly(9-fluorenyl methacrylate) as obtained above. The mixture was placed under nitrogen atmosphere and allowed to react at room temperature for 48 hours. Thereafter, 15 ml distilled water was gradually added in a dropwise manner to the reaction mixture at 0° C. which was subsequently made into a pH 11 aqueous solution by addition of a 33 wt. % aqueous solution of sodium hydroxide. This aqueous solution was then increased in volume to 35 ml by further addition of distilled water. After addition of 0.5 g sodium hydroxide, the aqueous solution was allowed to react at 60° C. for 100 hours. The resultant was made into a pH 2 aqueous solution, by addition of concentrated hydrochloric acid, which was subsequently dewatered by an evaporator and vacuum dried for 12 hours.

Subsequent to addition of 10 ml ether solution containing diazomethane, the resultant was reacted at room temperature for 24 hours and, subsequent to addition of 6 ml ether solution containing diazomethane, further reacted at room temperature for 24 hours. Desolvation using an evaporator and extraction followed. By these series of reactions, poly (9-fluorenyl methacrylate) was converted to polymethyl methacrylate.

$^1$H-NMR (500 MHz, $CDCl_3$ solution) of polymethyl methacrylate as such obtained was measured using an NMR measuring equipment. The following results were obtained: δ(ppm)=3.584 (3H), 2.163 (1H), 1.508 (1H), 1.193 (3H) and 0.865 (0.1H)

A triad isotacticity of poly(9-fluorenyl methacrylate) was determined from a shift position of an α-methyl group in $^1$H-NMR of polymethyl methacrylate. That is, an α-methyl peak of isotactic polymethyl methacrylate is known to appear at 1.2 ppm. Because the number of hydrogens as calculated from a peak area at 1.193 ppm was 3H for polymethyl methacrylate, the isotacticity was determined to be at least 99%.

(3) Measurement of Hole Mobility of Charge Transport Material (TOF Method)

Poly(9-fluorenyl methacrylate) was formulated into a 10 wt. % $CH_2Cl_2$ solution. 2,4,7-trinitrofluorene malononitrile, as a dopant, was dissolved therein in the amount of 1 weight %, based on the weight of poly(9-fluorenyl methacrylate). The resulting solution was cast onto an ITO glass substrate and then dried to provide thereon a charge transport material in the form of a thin film having a thickness of 1 μm.

Aluminum was vacuum deposited onto the resulting thin film to a thickness of 1,000 angstroms to form a 5 mm×5 mm aluminum electrode. A hole transfer time was measured by applying a voltage of 5 V to this electrode simultaneously with exposure thereof to a pulse laser beam (nitrogen laser, 150 μJ) at 337 nm. From a result of measurement at room temperature, a hole mobility was found to be $8.02 \times 10^{-4}$ $cm^2V^{-1}sec^{-1}$.

(4) Electrical Conductivity of Charge Transport Material

Poly(9-fluorenyl methacrylate) was formulated into a 10 wt. % $CH_2Cl_2$ solution. 2,4,7-trinitrofluorene malononitrile, as a dopant, was dissolved therein in the amount of 1 weight %, based on the weight of poly(9-fluorenyl methacrylate). The resulting solution was cast onto an ITO glass substrate and then dried to provide thereon a charge transport material in the form of a thin film having a thickness of 1 μm.

An aluminum electrode having a width of 5 mm, an interelectrode distance of 90 μm and a thickness of 100 nm was deposited onto the resulting thin film. Using this sample, an electrical conductivity of the charge transport material was measured, resulting in the value of $5.13 \times 10^{-5}$ S/cm.

In accordance with the present invention, an acrylic polymer which enables preparation of a charge transport material having superior charge transporting capability, as well as a charge transport material utilizing the acrylic polymer, can be provided.

What is claimed is:

1. An acrylic polymer containing pendant π-conjugated groups represented by the following general formula (1) and having a triad syndiotacticity of at least 60%:

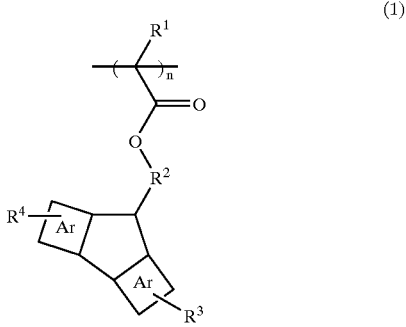

wherein in the formula (1), Ar represents an aromatic group, $R^1$ represents hydrogen or a methyl group, $R^2$ represents an organic group or none, $R^3$ and $R^4$ both represent hydrogen or at least one of them represents an electron-donating or electron-withdrawing group, and n denotes an integer of 2 or larger.

2. The acrylic polymer of claim 1, wherein said acrylic polymer is obtained via anionic polymerization.

3. A charge transport material containing the acrylic polymer of claim 1 and a dopant.

4. The acrylic polymer of claim 1, wherein said acrylic polymer is represented by the following general formula (2) and having a triad syndiotacticity of at least 60%:

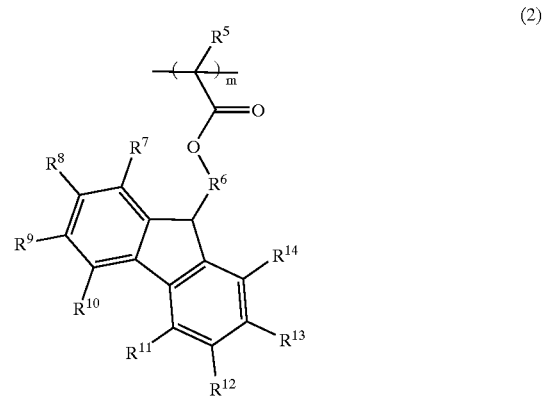

wherein in the formula (2), $R^5$ represents hydrogen or a methyl group, $R^6$ represents an organic group or none, $R^7$–$R^{14}$ all represent hydrogen or at least one of them represents an electron-donating or electron-withdrawing group, and m denotes an integer of 2 or larger.

5. The acrylic polymer of claim 4, wherein said acrylic polymer is obtained via anionic polymerization.

6. A charge transport material containing the acrylic polymer of claim 4 and a dopant.

7. An acrylic polymer containing pendant π-conjugated groups represented by the following general formula (1) and having a triad isotacticity of at least 60%:

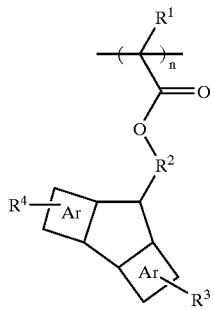

(1)

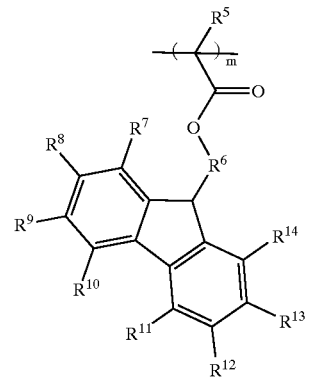

(2)

wherein in the formula (1), Ar represents an aromatic group, $R^1$ represents hydrogen or a methyl group, $R^2$ represents an organic group or none, $R^3$ and $R^4$ both represent hydrogen or at least one of them represents an electron-donating or electron-withdrawing group, and n denotes an integer of 2 or larger.

8. The acrylic polymer of claim 7, wherein said acrylic polymer is obtained via anionic polymerization.

9. A charge transport material containing the acrylic polymer of claim 7 and a dopant.

10. The acrylic polymer of claim 7, wherein said acrylic polymer is represented by the following general formula (2) and having a triad isotacticity of at least 60%:

wherein in the formula (2), $R^5$ represents hydrogen or a methyl group, $R^6$ represents an organic group or none, $R^7$–$R^{14}$ all represent hydrogen or at least one of them represents an electron-donating or electron-withdrawing group, and m denotes an integer of 2 or larger.

11. The acrylic polymer of claim 10, wherein said acrylic polymer is obtained via anionic polymerization.

12. A charge transport material containing the acrylic polymer of claim 10 and a dopant.

\* \* \* \* \*